(12) United States Patent
McCormick et al.

(10) Patent No.: US 10,044,621 B2
(45) Date of Patent: Aug. 7, 2018

(54) METHODS AND SYSTEMS FOR TRANSPORT SDN TRAFFIC ENGINEERING USING DUAL VARIABLES

(71) Applicants: William Carson McCormick, Kanata (CA); Mehdi Arashmid Akhavain Mohammadi, Kanata (CA)

(72) Inventors: William Carson McCormick, Kanata (CA); Mehdi Arashmid Akhavain Mohammadi, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 133 days.

(21) Appl. No.: 14/986,185

(22) Filed: Dec. 31, 2015

(65) Prior Publication Data

US 2017/0195230 A1     Jul. 6, 2017

(51) Int. Cl.
*H04L 12/803* (2013.01)
*H04L 12/801* (2013.01)
*H04L 29/08* (2006.01)

(52) U.S. Cl.
CPC ............ *H04L 47/122* (2013.01); *H04L 47/11* (2013.01); *H04L 69/326* (2013.01)

(58) Field of Classification Search
CPC ..... H04L 47/122; H04L 47/11; H04L 69/326; H04L 45/125; H04L 47/125; H04L 41/0654; H04L 45/14; H04L 45/38; H04L 41/0695; H04L 41/142; H04L 41/5025; H04L 43/08; H04L 43/16; H04L 45/124; H04L 45/42; H04B 10/0795
See application file for complete search history.

(56) References Cited

U.S. PATENT DOCUMENTS

| 2013/0198372 | A1  | 8/2013  | Wei et al.              |
| 2013/0258847 | A1  | 10/2013 | Zhang et al.            |
| 2013/0279327 | A1* | 10/2013 | Lewin-Eytan ... H04L 47/10 370/229 |
| 2016/0294700 | A1* | 10/2016 | Kodialam ....... H04L 47/125 |
| 2017/0126314 | A1* | 5/2017  | Prakash ......... H04B 10/0795 |

FOREIGN PATENT DOCUMENTS

| CN | 1756143 A    | 4/2006  |
| CN | 104170335 A  | 11/2014 |
| WO | 2005064983 A1| 7/2005  |

OTHER PUBLICATIONS

Kelly et al, "Rate control for communication networks: shadow prices, proportional fairness and stability", Journal of the Operational Research Society, vol. 49, Issue 3, pp. 237-252, Mar. 1998.
Shrimali et al, "Cooperative Inter-Domain Traffic Engineering using Nash Bargaining and Decomposition", IEEE/ACM Transactions on Networking, vol. 18, No. 2, pp. 341-352, Apr. 2010.

* cited by examiner

*Primary Examiner* — Awet Haile

(57) ABSTRACT

Methods and systems for managing a network. A TSDN controller determines a change or an anticipated change in traffic in the network. The controller identifies one or more congested links in the network by solving an optimization problem for maximizing network utility to accommodate the change or anticipated change. Solving the optimization problem includes solving for a set of link constraint dual variables associated with links of the network. The link capacity of one or more links of the network is adjusted to decrease the congestion.

18 Claims, 3 Drawing Sheets

METHODS AND SYSTEMS FOR TRANSPORT SDN TRAFFIC ENGINEERING USING DUAL VARIABLES

FIELD

The present disclosure relates to methods and systems for traffic engineering in transport software-defined networks.

BACKGROUND

Transport software-defined networking (TSDN) is based on the application of software-defined networking (SDN) techniques to the transport layers of network such as a service provider Wide Area Network (WAN). A TSDN controller is typically employed to monitor and manage traffic flows in the network.

A TSDN controller computes flow assignments and placements, typically through the solution of optimization problems. When a new flow is to be added to the network and the network has reached a certain capacity, the controller may determine that one or more existing flows should be rerouted to accommodate the new flow.

Alternatively, the capacities of one or more links may be adjusted to accommodate the new flow. Conventionally, the determination that flows should be rerouted, or that links should be adjusted involve the manual identification of congestion points. Such conventional approaches are often time-consuming, and may result in time delays and/or may result in less efficient network utilization. It will be understood that when reference is made to adjusting the capacity of a link, reference is being made to a logical link that relies upon an underlying physical network. Capacity of a logical link can be less than that of the physical link by enforcing capacity constraints at a logical level. Capacity of the logical link can exceed that of an underlying physical link through the use of techniques such as Link Aggregation that allows a plurality of physical links to be treated as a single logical link.

SUMMARY

In some examples, the present disclosure describes a method for managing a network. The method includes: receiving information about traffic in the network; determining a change or an anticipated change in traffic in the network; identifying one or more congested links in the network by solving an optimization problem for maximizing network utility to accommodate the change or anticipated change, wherein solving the optimization problem includes solving for a set of link constraint dual variables associated with links of the network; adjusting capacity of one or more links of the network, to decrease congestion on at least one congested link; and updating a network configuration dataset to reflect the adjusted capacity.

In some examples, the present disclosure describes a system for managing a network. The system includes: a transport software-defined networking (TSDN) controller configured to manage traffic over the network, the TSDN controller comprising a processor configured to execute instructions to cause the TSDN controller to: receive information about traffic in the network; determine a change or an anticipated change in traffic in the network; identify one or more congested links in the network by solving an optimization problem for maximizing network utility to accommodate the change or anticipated change, wherein solving the optimization problem includes solving for a set of link constraint dual variables associated with links of the network; adjust capacity of one or more links of the network, to decrease congestion on at least one congested link; and update a network configuration dataset to reflect the adjusted capacity.

In some examples, the present disclosure describes a computer readable medium having computer-executable instructions encoded thereon, wherein the instructions, when executed by a processor of a transport software-defined networking (TSDN) controller, causes the TSDN controller to manage a network by: receiving information about traffic in the network; determining a change or an anticipated change in traffic in the network; identifying one or more congested links in the network by solving an optimization problem for maximizing network utility to accommodate the change or anticipated change, wherein solving the optimization problem includes solving for a set of link constraint dual variables associated with links of the network; adjusting capacity of one or more links of the network, to decrease congestion on at least one congested link; and updating a network configuration dataset to reflect the adjusted capacity.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
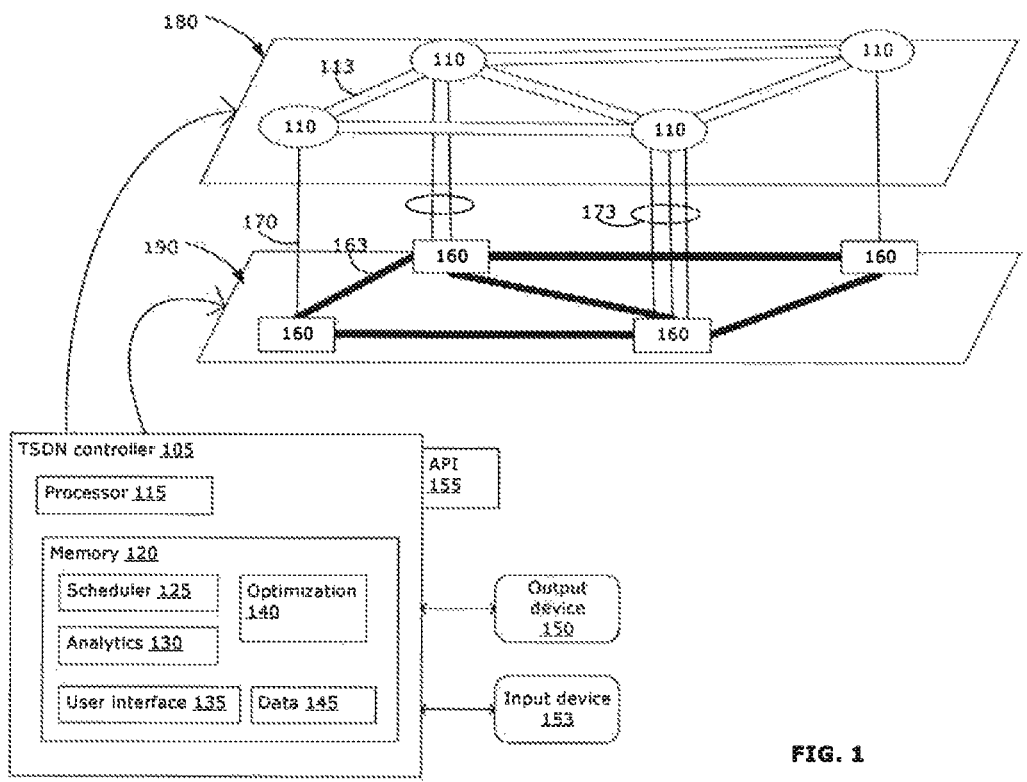
FIG. 1 is a schematic diagram illustrating an example TSDN controller managing an IP network and an optical transport network.

FIG. 1 is a schematic diagram illustrating an example TSDN controller 105 managing a simplified example IP network 180 (also referred to as the IP layer) and a simplified example optical transport network 190 (also referred to as the optical layer). In this example, the TSDN controller 105 monitors and manages connections among four routers 110 in the IP network 180 and among four transport nodes 160 in the optical transport network 190. In some examples, there may be a plurality of TSDN controllers 105 working together. Although four routers 110 and four transport nodes 160 are shown, it should be understood that the IP network 180 and the optical transport network 190 may be much more complex with many more routers 110 and nodes 160. Further, the number of routers 110 may not correspond to the number of transport nodes 160.

The TSDN controller 105 may include one or more processors 115 coupled to one or more memories 120. The processor(s) 115 may access data in the internal memory(ies) 120 and/or one or more external memories (not shown), and may execute instructions stored in the internal memory(ies) 120 and/or external memory(ies). For example, the memory(ies) 120 may include instructions that when executed cause the TSDN controller 105 to implement a scheduler function 125, an analytics function 130, a user interface function 135 and a network optimization function 140. The scheduler function 125 may perform path scheduling among the routers 110. This may enable very precise time-synchronized path addition/removal, for near-hitless network movements. The analytics function 130 may serve to perform statistical analysis on path traffic. For example, the analytics function 130 may monitor the IP network 180 for any changes or development of problems, and may provide early warning of expected network problems. The user interface function 135 may serve to provide a user interface with which a user (e.g., a network administrator) may provide input to the TSDN controller 105 and may also provide output (e.g., graphical output) to a user. The network optimization function 140 may serve to perform network utilization optimization, for example including routing of traffic and/or setting link capacity (e.g., as discussed herein).

Such functions 125, 130, 135, 140 may be provided by respective software modules or applications executed by the processor(s) 115, may be provided by a single software module or application, may be provided by combinations of multiple software modules or applications, or may be provided simply as coded instructions in an operating system, for example.

The memory(ies) 120 may further store data 145, such as data relevant to managing the IP network and the optical transport network, for example including a network configuration dataset that describes the current network/traffic flow configuration. The TSDN controller 105 may also store in its memory(ies) 120 (or external memory(ies)) a record of all network events, and may enable playback or review of network events off-line.

The processor(s) 115 may be coupled to an output device 150 (e.g., a computer monitor) internal or external to the TSDN controller 105, to provide output to a user via the user interface function 135, for example. The user interface function 135 may enable output of a high quality 3D graphics display of the managed network, for example using a simple user interface. The processor(s) 115 may also be coupled to an input device 153 (e.g., a keyboard) internal or external to the TSDN controller 105, to enable a user (e.g., a network administrator) to provide input (e.g., control instructions), for example via a user interface provided by the user interface function 135. The user interface may be a user extensible user interface, with embedded programming. The TSDN controller 105 may also include one or more application program interfaces (APIs) 155, to enable the TSDN controller 105 to interface with one or more external systems (not shown). For example, an API 155 may enable a third-party application to schedule connections, check network status or add/remove paths, among other tasks.

The routers 110 may communicate with each other via IP links 113 over the IP network 180. The nodes 160 may communicate with each other via physical optical links 163 (e.g., optical fibers). The IP links 113 may be realized using the physical optical links 163 in the optical transport network 190. Although FIG. 1 shows the IP links 113 corresponding approximately to the optical links 163, the topology of the links 113 in the IP network 180 may be different from that of the links 163 in the optical transport network 190. For example, traffic that may flow in a direct IP link 113 between two routers 110 may in fact be routed through several optical links 163 and several nodes 160 in the optical transport network 190. The IP network 180 and the optical transport network 190 may be connected via ports 170. By increasing the number of ports 170 between a router 110 and a node 160, for example using a link aggregation group (LAG) 173, the capacity of a IP link 113 may be increased.

Communications between the TSDN controller 105 and the routers 110 and nodes 160 may be using any suitable protocol, such as Open Shortest Path First (OSPF) for communication with the routers 110. The routers 110 may have simple IPv6 connectivity, such as using zero configuration v6 (e.g., using addresses assigned during manufacturing). The routers 110 may run Generalized Multi-Protocol Label Switching (GMPLS) extensions to OSPF, which may enable the routers 110 to inform the TSDN controller 105 of its associated link constraints. The information about constraints may be stored as data 145 in the TSDN controller 105. One skilled in the art will appreciate that other protocols may be used for connectivity, including but not limited to IPv4.

Figure 2:
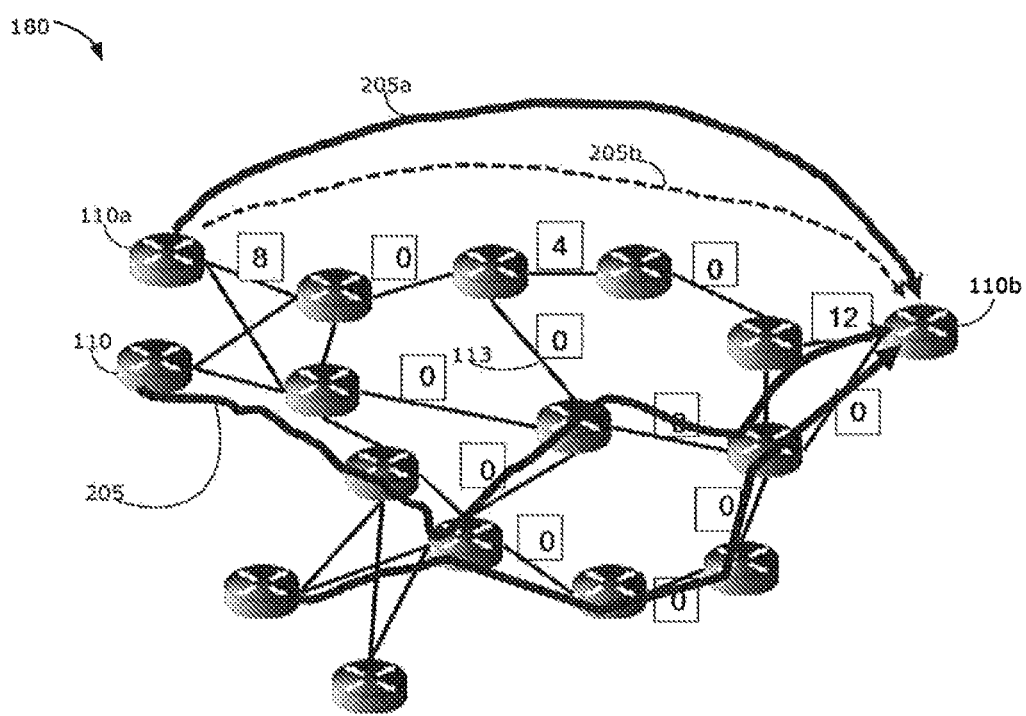
FIG. 2 is a schematic diagram of an example IP network, illustrating example traffic flow.

FIG. 2 shows an example IP network 180, with example traffic flows over routers 110. When a new flow is to be added to the network (e.g., in response to a new traffic request from a site), the TSDN controller (not shown) performs optimization (e.g., using the optimization function 140) to route the new flow and possibly reroute or adjust one or more existing flows. In the case where parts of the network are congested, the controller may reroute existing flow(s) or adjust link capacity (e.g., using LAG), to optimize network resource utilization.

In examples described herein, the TSDN controller may perform optimization by taking into account dual variables, for example link constraints (also referred to as shadow prices). The TSDN controller may solve for the dual variables in solving the optimization problem, in order to determine how to adjust link capacity.

To assist in understanding the present disclosure, a brief discussion of network utility maximization (NUM), as a dual optimization problem, is provided below. NUM may be performed by the TSDN controller in order to manage traffic flows in the network.

NUM may refer to the process of routing flows through a network by solving an optimization problem that maximizes network utility. In general, the utility function is a function of the flows on the network, and may be represented as:

$$U = \sum_s U_s(X_s)$$

where $X_s$ presents some flow indexed by s, and $U_s$ is the utility of flow s.

NUM problems are also subject to optimization constraints. An applicable constraint type may be link capacity. A link capacity constraint may be represented as:

$$AX \leq C$$

where X represents a vector of all the flows, A represents a flow-link incidence matrix and C is the vector of link capacities. The meaning of this constraint is that the sum of all the traffic from all the flows using a given link must be less than the capacity of the given link. In this case, the route the flow takes through the network may have been pre-computed by some suitable means, for example using a shortest path computation algorithm (e.g., Djikstra's algorithm).

The dual form of a linear NUM problem is now discussed. For the moment, assume that $U_s(X_s)$ is a linear function of $X_s$. In this case, the NUM problem is a linear optimization problem and the dual form may be derived directly. If the primal problem is:

$$\text{maximize } \Sigma u_s X_s$$

$$\text{subject to } AX \geq U$$

then the dual problem is:

$$\text{minimize } \Sigma c_j Y_j$$

$$\text{subject to } A^T Y \geq U$$

where the dual variables of the link capacity constraints are $Y=\{Y_j\}$. These link constraints may also be referred to as shadow prices for the links.

There are different types of NUM problems that may fall into the general form discussed above, for example: fair network problem, flow splitting problem, unicast path computation and multicast path computation, among others.

Consider the fair network problem. Fair networks may have complex utility functions. In a proportional fair network, the utility function is $U_s(X_s)=\log(X_s)$. In an alpha fair network, the utility function is of the form:

$$U_s(X_s) = w_s \frac{X_s^{1-\alpha}}{1-\alpha}.$$

Max-min fair networks are usually represented as a sequence of NUM problems that must be solved in order.

In flow splitting, NUM problems may be solved to split flows so that each flow can use multiple paths through the network. In this case, the NUM problem may include additional constraints to ensure that the total bandwidth of the flow is equal to the sum of the bandwidth on each path through the network.

For unicast path computation, NUM problems may be defined to compute routes through the network. In this case, the NUM problem may include additional constraints (which may be referred to as flow conservation constraints) to ensure that the flows have a contiguous route through the network.

A multicast path computation may be similar to unicast path computation. NUM problems may be solved to build multicast trees in a network. Extra constraints may be used to construct the tree structures.

As well, different types of NUM problems may be combined. For example, a proportional fair problem may be combined with a multicast path computation problem, to produce proportionally fair multicast trees.

Reference is again made to FIG. 2. FIG. 2 shows an example IP network 180 having a plurality of routers 110 in communication with each other over IP links 113. The link constraint for various links 113 are shown (boxed numerals). A link constraint may be a measure of the value of a link 113 to the network 180 and/or for a particular flow 205. Link constraints, although not a direct measurement of a physical property of the links 113, may be mathematical representations of the value of a given link. Generally, congested links 113 have non-zero link constraint values. A link 113 with a larger link constraint value may indicate that an increase in the capacity of a given link 113 has increased benefit to network utility compared to other links 113 with lower link constraint values, resulting in a larger impact to the value of the utility function. In examples described herein, link constraints may be used as the dual variables in the optimization problem to be solved by the TSDN controller. Link constraints used in optimization problems may also be referred to as shadow prices.

In the simplified example shown, there are three existing flows 205 (thick arrows) over the network 180. Each flow 205 may be logically represented as a direct path between two routers 110, or more generally between two sites. In actuality, each flow 205 may be routed via multiple routers 110 and over multiple IP links 113, with corresponding routing over optical transport nodes and optical transport links (not shown). The TSDN controller may manage routing of traffic over the network 180, including rerouting traffic and adjusting the capacity of links 113, as appropriate, to accommodate changes in traffic and/or network structure, for example.

Consider the case where there is an existing flow 205a between routers 110a and 110b. A new flow 205b (dotted arrow) is to be added between routers 110a and 110b. Because the new flow 205b is between the same routers 110a and 110b as the existing flow 205a, it may be more efficient to route the new flow 205b through the same path as the existing flow 205a. However, one or more links 113 currently used by the existing flow 205a may already be at or near capacity and adding additional traffic would result in congestion. This may be indicated by the links 113 having non-zero link constraint values. In the example of FIG. 2, three links 113 between routers 110a and 110b have non-zero link constraint values, specifically 8, 4 and 12. The link constraint values associated with each link 113 may be determined by the TSDN controller by solving the optimization problem discussed herein.

In some examples, the TSDN controller may route the new flow 205b and/or reroute the existing flow 205a so as to avoid or reduce traffic through the congested links 113. In some examples, the TSDN controller may adjust the capacity of one or more links 113 (possibly including one or more currently congested links 113), for example using LAG. Adjusting the link capacity may enable the new flow 205b to be accommodated without having to reroute any existing flow 205, which may be useful because rerouting an existing flow 205 may interrupt service to the flow 205, which is typically undesirable. Further, rerouting a flow 205 to an alternate path may result in a longer path, which may incur more delay, and/or may make less efficient use of network resources (e.g., requiring use of a greater number of links 113).

In some examples, there may be more than one IP network using the same optical transport network. In such examples, the TSDN controller may manage all IP networks over the optical transport network, for example according to the examples described herein. Although the IP networks may operate independently of each other, the TSDN controller may manage traffic with a consideration as to how traffic from all IP networks impact the shared optical transport network.

In an example, the TSDN controller may adjust the capacity of one or more links 113, based the solution to an optimization problem to compute flow assignments and placements. The optimization problem may be a dual optimization problem, with the primal problem being the maximization of network utility and the dual problem being the minimization of link constraint values, for example as represented by the above-discussed example equations. The dual problem may be solved together with the primal problem, with the solution of the dual problem serving as constraints for solving the primal problem. The TSDN controller may determine the values of the link constraints by solving the dual problem. Generally, links 113 having larger link constraint values would benefit the most from an increase in capacity. In the example shown in FIG. 2, the link 113 associate with link constraint value 12 may benefit the most from an increase in capacity. With link constraint values being an input to the primal network utility problem, the TSDN controller may optimize the link capacity accordingly (e.g., with preference given to increasing the link capacity of links 113 having higher link constraint values), in order to optimize network utility.

The TSDN controller may optimize network utility in order to: accommodate the new flow; reduce the impact to existing flows when accommodating the new flow; determine an acceptable impact to existing flows to accommodate the new flow (e.g., where there is limited ability to increase network capacity); or may determine that the new flow cannot be accommodated.

Figure 3:
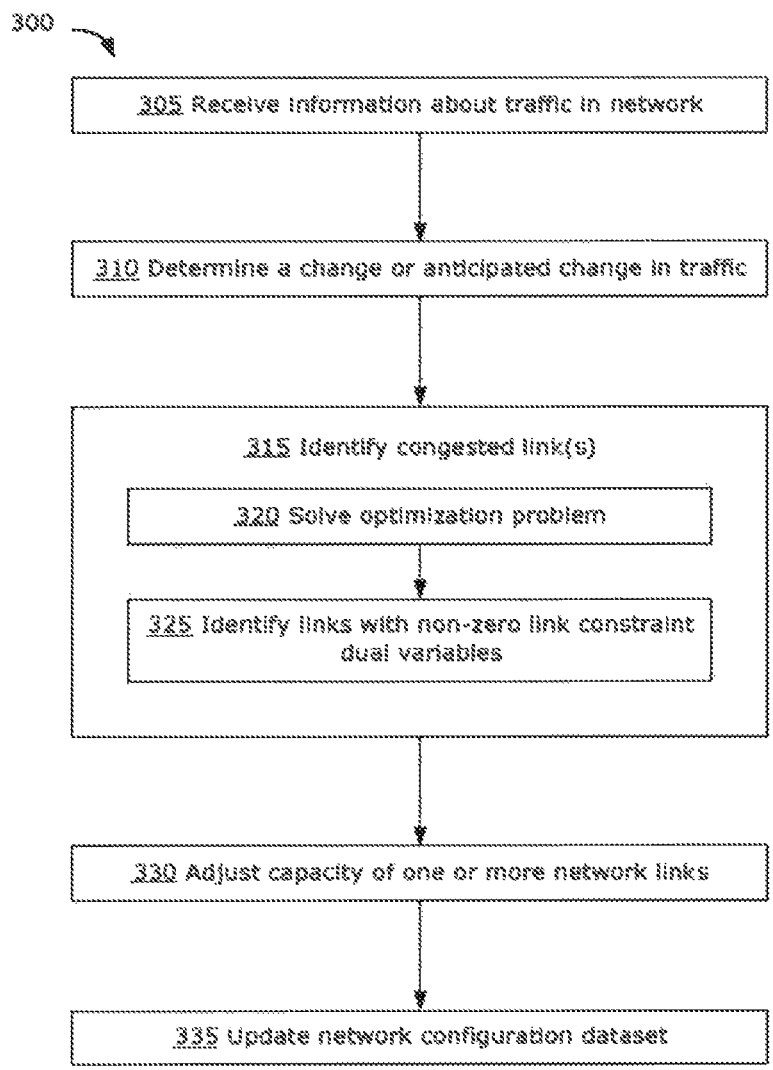
FIG. 3 is a flowchart illustrating an example method for managing traffic flow.

FIG. 3 is a flowchart illustrating an example method 300 that may be performed by the TSDN controller, in order to implement an example described herein. The example method 300 may be carried out by the example TSDN controller 105 illustrated in FIG. 1, for example.

At 305, the TSDN controller may receive information about traffic in the network. This information may be received from the TSDN controller's own monitoring function(s) (e.g., its analytics function 130), from user input (e.g., from a network administrator inputting control instructions via a user interface), and/or as traffic updates or requests received from one or more network sites or routers.

At 310, based on the received information, the TSDN controller may determine there is a change or an anticipated change in the traffic flow. A change may include, for example, an increase/decrease in traffic on one or more existing flows, addition of one or more new routers, or removal of one or more existing routers. An anticipated change may include, for example, a request to add one or more new flows, a request to remove an existing flow, a request to add one or more new routers, or a request to remove one or more new routers. Although it may not be strictly necessary to accommodate a decrease in traffic, it may be useful for the TSDN controller to take this into account, because a decrease in traffic on one flow may provide an opportunity for improving traffic flow elsewhere in the network.

In some examples, the TSDN controller may determine there is a change in traffic only when the increase/decrease in traffic exceeds a predefined amount for a predefined period of time, to avoid unnecessarily taking into account transient changes. In some examples, the TSDN controller may accommodate change based on a hysteresis model, in which an increase in traffic is quickly accommodated but a decrease in traffic is less quickly taken into account.

At 315, the TSDN controller may identify one or more congested links in the network. This may involve solving an optimization problem at 320, for maximizing network utility. The optimization problem may, as discussed above, define a primal problem to maximize network utility (e.g., to accommodate the change or anticipated change in traffic) and define a dual problem to minimize link constraints. The result of solving the optimization problem may include a set of link constraint dual variables associated with the links of the network. The congested link(s) may be identified, at 325, by identifying the link(s) with non-zero link constraint dual variables.

At 330, the TSDN controller may adjust the capacity of one or more IP links of the IP network, based on the solution to the optimization problem. The capacity may be adjusted in order to decrease congestion on one or more of the congested link(s). The capacity may be adjusted to prioritize the link capacity of the congested link(s) with highest or higher link constraint dual variables, because this may be expected to result in greater improvements in network utility. When the link capacity of a congested link is prioritized, the result may be that the TSDN controller preferentially increases the link capacity of the prioritized link. The TSDN controller may increase the capacity of a congested link at the expense of a non-congested link, for example. The TSDN controller may also increase the capacity of a non-congested link, if appropriate. The TSDN controller may adjust capacity using any suitable technique including, for example, multiprotocol label switching traffic engineering (MPLS-TE), LAG, or FlexEthernet protocol.

At 335, the TSDN controller updates a network configuration dataset (e.g., stored as data 145 in the memory of the TSDN controller and/or stored externally) to reflect the adjusted capacity. Output may be provided (e.g., to a network administrator) via the output device of the TSDN controller, indicating the change to the network configuration. For example, the administrator may be provided with a notification and/or a graphical representation of the change.

In some examples, the TSDN controller may determine that it is not appropriate to accommodate a requested traffic change (e.g., a request to add a new flow). For example, the TSDN controller may determine that link capacity cannot be increased to accommodate additional traffic, or the TSDN controller may determine that the changes necessary to accommodate the change in traffic would adversely impact other flows to an unacceptable degree. In some examples, a preliminary process may be carried out, prior to calculating the optimization problem, that may roughly weed out any requested traffic changes that should be rejected. For example, a preliminary process may use a very general upper threshold to reject a requested traffic change that exceeds the maximum permitted traffic flow.

The approach of solving an optimization problem for adjusting link capacity, taking into account link constraints as dual variables, may differ from conventional approaches to IP and optical network management. For example, the conventional approach may be to only track link utilization over time, then manually and reactively identify (e.g., by the network administrator) congested links to be addressed.

In contrast, the example approached described herein, by taking into account link constraints as dual variables to be considered, may enable the TSDN controller to proactively, and with minimal or no user input, identify links that may benefit from an increase in link capacity and adjust link capacity accordingly (e.g., using MPLS-TE, LAG, FlexEthernet protocol, or any other suitable technique). This may reduce the length of time in which traffic is congested, for example. Additionally, this approach may help to reduce the manual activity required from the network administrator.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for managing a network, the method comprising:
    receiving information about traffic in the network;
    determining a change or an anticipated change in traffic in the network;
    identifying one or more congested links in the network by solving an optimization problem for maximizing network utility to accommodate the change or anticipated change, wherein solving the optimization problem includes solving for a set of link constraint dual variables associated with links of the network, and wherein identifying the one or more congested links comprises identifying one or more links having non-zero link constraint dual variables as the one or more congested links;
    adjusting capacity of one or more links of the network, to decrease congestion on at least one congested link; and
    updating a network configuration to reflect the adjusted capacity.

2. The method of claim 1, wherein adjusting capacity comprises increasing capacity of the one or more links.

3. The method of claim 2, wherein adjusting capacity comprises increasing capacity of one or more congested links.

4. The method of claim 2, wherein adjusting capacity comprises increasing capacity using one of: multiprotocol label switching traffic engineering (MPLS-TE), link aggregation group (LAG), or FlexEthernet.

5. The method of claim 1, wherein adjusting capacity comprises prioritizing link capacity of any links with higher non-zero link constraint dual variables.

6. The method of claim 1, wherein solving the optimization problem comprises solving a dual problem for minimizing link constraints.

7. A system for managing a network, the system comprising:
    a transport software-defined networking (TSDN) controller configured to manage traffic over the network, the TSDN controller comprising a processor configured to execute instructions to cause the TSDN controller to:
        receive information about traffic in the network;
        determine a change or an anticipated change in traffic in the network;
        identify one or more congested links in the network by solving an optimization problem for maximizing network utility to accommodate the change or anticipated change, wherein solving the optimization problem includes solving for a set of link constraint dual variables associated with links of the network, and wherein identifying the one or more congested links comprises identifying one or more links having non-zero link constraint dual variables as the one or more congested links;
        adjust capacity of one or more links of the network, to decrease congestion on at least one congested link; and
        update a network configuration dataset to reflect the adjusted capacity.

8. The system of claim 7, wherein the processor is further configured to execute instructions to further cause the TSDN controller to adjust capacity by increasing capacity of the one or more links.

9. The system of claim 8, wherein the processor is further configured to execute instructions to further cause the TSDN controller to adjust capacity by increasing capacity of one or more congested links.

10. The system of claim 8, wherein the processor is further configured to execute instructions to further cause the TSDN controller to adjust capacity by increasing capacity using one of: multiprotocol label switching traffic engineering (MPLS-TE), link aggregation group (LAG), or FlexEthernet.

11. The system of claim 7, wherein the processor is further configured to execute instructions to further cause the TSDN controller to adjust capacity by prioritizing link capacity of any links with higher non-zero link constraint dual variables.

12. The system of claim 7, wherein the processor is further configured to execute instructions to solve the optimization problem by solving a dual problem for minimizing link constraints.

13. A non-transitory computer readable medium having computer-executable instructions encoded thereon, wherein the instructions, when executed by a processor of a transport software-defined networking (TSDN) controller, cause the TSDN controller to manage a network by:
    receiving information about traffic in the network;
    determining a change or an anticipated change in traffic in the network;
    identifying one or more congested links in the network by solving an optimization problem for maximizing network utility to accommodate the change or anticipated change, wherein solving the optimization problem includes solving for a set of link constraint dual variables associated with links of the network, and wherein identifying the one or more congested links comprises identifying one or more links having non-zero link constraint dual variables as the one or more congested links;
    adjusting capacity of one or more links of the network, to decrease congestion on at least one congested link; and
    updating a network configuration dataset to reflect the adjusted capacity.

14. The non-transitory computer readable medium of claim 13, wherein the instructions cause the TSDN controller to adjust capacity by increasing capacity of the one or more links.

15. The non-transitory computer readable medium of claim 14, wherein the instructions cause the TSDN controller to adjust capacity by increasing capacity of one or more congested links.

16. The non-transitory computer readable medium of claim 14, wherein the instructions cause the TSDN controller to adjust capacity by increasing capacity using one of: multiprotocol label switching traffic engineering (MPLS-TE), link aggregation group (LAG), or FlexEthernet.

17. The non-transitory computer readable medium of claim 13, wherein the instructions cause the TSDN controller to adjust capacity by prioritizing link capacity of any links with higher non-zero link constraint dual variables.

18. The non-transitory computer readable medium of claim 13, wherein the instructions cause the TSDN controller to solve the optimization problem by solving a dual problem for minimizing link constraints.

* * * * *